(12) United States Patent
Carter

(10) Patent No.: US 7,404,589 B2
(45) Date of Patent: Jul. 29, 2008

(54) COMBINATION DRAPING CANINE FABRIC ARTICLE AND SEAT COVER FOR USE WITH A VEHICLE

(76) Inventor: Kenneth Carter, 11331 Patton, Detroit, MI (US) 48228

( * ) Notice: Subject to any disclaimer, the term of this patent is extended or adjusted under 35 U.S.C. 154(b) by 210 days.

(21) Appl. No.: 11/301,591

(22) Filed: Dec. 13, 2005

(65) Prior Publication Data

US 2007/0138831 A1 Jun. 21, 2007

(51) Int. Cl.
*B60J 9/00* (2006.01)
(52) U.S. Cl. .................................. 296/153; 297/228.12
(58) Field of Classification Search ................ 296/39.1, 296/152, 153; 297/219.1, 227, 228.12, 228.13
See application file for complete search history.

(56) References Cited

U.S. PATENT DOCUMENTS

| | | | |
|---|---|---|---|
| 4,669,779 A | 6/1987 | Kaganas et al. | |
| 4,758,043 A | 7/1988 | Reynaldos | |
| 4,805,957 A | * 2/1989 | Fletcher | ...................... 296/153 |
| 5,129,695 A | 7/1992 | Norman, II | |
| 5,403,066 A | 4/1995 | Drum | |
| 5,713,624 A | 2/1998 | Tower | |
| 5,956,918 A | 9/1999 | Wise | |
| 5,957,528 A | 9/1999 | Campbell | |
| 6,000,365 A | 12/1999 | Charnesky | |
| 6,513,861 B2 | 2/2003 | DiGrazia | |
| D478,456 S | 8/2003 | Yoon | |
| 6,926,341 B1 | 8/2005 | Addesso et al. | |
| 7,000,984 B1 | * 2/2006 | Ward | ...................... 297/228.12 |
| 2003/0227200 A1 | * 12/2003 | Lopez | ........................ 297/225 |

OTHER PUBLICATIONS

1997 Economic Census: Comparative Statistics, Core Business Statistics Series. U.S. Department of Commerce, Economics and Statistics Administration, U.S. Census Bureau, Jun. 2000. www.census.gov/, Nov. 2000.
1997 Economic Census: Summary Statistics for United States (1997 NAICS Basis). U.S. Department of Commerce, Economics and Statistics Administration, U.S. Census Bureau. www.census.gov/, Nov. 2000.

(Continued)

*Primary Examiner*—Joseph D Pape
(74) *Attorney, Agent, or Firm*—Gifford Krass Sprinkle Anderson & Citkowski

(57) ABSTRACT

A convertible and drapable fabric article for use in a vehicle. The fabric includes a first fabric half and a second fabric half separated by an intermediate section exhibiting a plurality of parallel spaced fold lines. The intermediate section supports the fabric article upon a ledge associated with a door window opening of the vehicle in a first configuration, and such that the first half drapes over an exterior of the vehicle adjacent the window opening. At least one element is associated with at least one of the first and second fabric halves, these typically being releasably attachable magnets to support the paws of a canine perched upon the door window opening and extending across an open window. The fabric article is further converted to a second configuration whereby hook-and-loop fasteners associated with extending straps secure the fabric halves to seat back and seat bottom interior locations of the vehicle.

8 Claims, 2 Drawing Sheets

OTHER PUBLICATIONS

Statistical Abstract of the United States: 2001 (121st Edition). Bueau of the Census, Department of Commerce, Washington, D.C., Oct. 2001.

2001-2002 APPMA National Pet Owners Survey. American Pet Products Manufacturers Association, Inc., Greenwich, Connecticut, 2001.

"New Study Finds Pet Dogs and Cats in Over Half of All U.S. Homes" (press release), Pet Food Institute, Washington, DC, Feb. 13, 2002. www.petfoodinstitute.org/, Mar. 2002.

"State of the Industry" (published and unpublished data), Pet Product News, Spring/Summer 2002 Buying Guide.

"U.S. Pet Industry Sales to Cross $33.5 Billion by 2005" (press release), Business Communications Company, Inc., Norwalk, Connecticut, Oct. 3, 2000. www.bccresearch.com/, Apr. 2002.

Ward's Motor Vehicle Facts & Figures 2001. Ward's Communications, Southfield, Michigan, 2002.

"U.S. Exports by SIx-Digit NAICS, 2000 & 2001" (custom report), U.S. Census Bureau, Foreign Trade Division, Feb. 2002.

"Holiday 2001 Online Shopping Results: Traffic Up 50 Percent Compared With Last Year" (press release), Jupiter Madia Metrix, New York, New York, Jan. 7, 2002. www.jmm.com/, Mar. 2002.

"Tomorrow's Online Shopper Will Be Older and Less Affluent" (press release), Jupiter Madia Metrix, New York, New York, Mar. 4, 2002. www.jmm.com/, Mar. 2002.

Double Click on iTV White Paper: Improved TV Ad Effectiveness Through Internet-like Targeting and Reporting. Doubleclick, Inc., New York, New York, Jul. 2001. www.doubleclick.com/, Apr. 2002.

"Multi-Channel Holiday Shopping Study (Executive Summary)," DoubleClick Newsletter, Jan. 2002 issue. DoubleClick, Inc., New York, New York. www.doubleclick.com/Apr. 2002.

"Direct Marketing Under Siege," Advertising Age, Oct. 29, 2001. www.adage.com/, Mar. 2002.

Catalog Industry Trend Report. Abacus, Broomfield, Colorado, Spring 2001.

"The Novelty of the Internet is Starting to Fade," Weekly Corporate Growth Report, Aug. 13, 2001.

"Industry Update: Challenges and Opportunities" (conference address), Robert Weitzen, President/CEO, Direct Marketing Association, New York, New York, Winter 2002. www.the-dma.org/, Mar. 2002.

"Value of U.S. DM Driven Sales by Medium and Market" (table), Direct Marketing Association, New York, New York. www.the-dma.org/, Mar. 2002.

"Online Media Strategies for Advertising," Advertising Age, Spring 1998.

"It's a Woman's Web," Brandweek, Sep. 7, 1998.

"Help Wanted," Brandweek, Apr. 26, 1999.

"Advertising Age Teams With eMarketer for Research Report," Advertising Age, May 3, 1999.

"Against the Odds," Forbes, Mar. 10, 1997.

"Hooked on Home Shopping," Ladies' Home Journal, Oct. 1997.

The American Pet Products Manufacturers Association Home Page, http://www.appma.org/, updated Nov. 2004.

"Practical, Convenient Products Emerge as Top Dog at World's Largest Annual Pet Products Show," Buesiness Wire, Mar. 29, 2004.

* cited by examiner

COMBINATION DRAPING CANINE FABRIC ARTICLE AND SEAT COVER FOR USE WITH A VEHICLE

BACKGROUND OF THE INVENTION

1. Field of the Invention

The present invention relates generally to fabric overlays and covers for use such as with a vehicle interior or window. More specifically, the present invention discloses a convertible and drapable canine fabric article and seat cover for use with a vehicle and which protects a vehicle seat and door panel adjacent a window opening.

2. Description of the Prior Art

The prior art is well documented with examples of protective coverings, such as for use with a vehicle. The purpose of such coverings is typically to protect a selected interior or exterior location of the vehicle.

U.S. Pat. No. 6,000,365, issued to Charnesky, teaches a paw pad removable structure placeable both upon and in a car door on which to allow pets to place their paws in order to allow them to place their head outside an open car door window and which provides a support base which serves to support and restrain them during vehicle motion.

U.S. Pat. No. 6,926,341, issued to Addesso, teaches a portable pet car door protector for protecting a car door interior panel. The protector includes a flap insertable in the well between the window and the interior portion of the car door. A pad is secured to the top edge of the flap and pad has a length sufficient to extend over the interior portion of the car door and extend approximately to the interior floor board in order to protect against the animal's nails and teeth. The protector includes at least one hang tab secured to the top edge of the flap, such that a user may easily install and remove the protector from the well.

U.S. Pat. No. 4,758,043, issued to Reynaldos, teaches a flap for vehicle windows including flexible internal and external sheets that sandwich a cushion member. Three portions or sections are defined, namely, an external end section, a middle section, and an internal section. The middle section mounts over a conventional window opening and includes the cushion member. A magnetic member is further mounted to the underside of the external lowermost end of the external section and it is intended to removably secure the external section against the vehicle. Adhesive means are further provided to removably secure the internal section to the interior of the vehicle's door.

A further example drawn from the prior art is disclosed in U.S. Pat. No. 5,956,918, and which teaches an automobile door protector in the form of an elongated cushioned member, the ends of which are connected to a flexible stop through a pair of elastic straps. The straps include hook-and-loop fasteners attached to them near the flexible stops which work in cooperation with corresponding fasteners permanently attached to the inside edge of the automobile door to allow the cushion to fit tightly against the outside surface of the auto door and to hold the cushion in a set position. Upon closing the auto door, the flexible stops are trapped so that the device cannot be removed.

U.S. Pat. No. 5,957,528, issued to Campbell, teaches a seat cover constructed of a washable fabric and including flexible foam attachment members and a flexible foam flap and is removably installed on a vehicle's seat. The basic structure of the seat cover consists of a seat portion and a back portion with a flap longitudinally extending between the seat and back portions. The flap portion has one or more deformable pad members affixed to the flap for insertion into the seat between the back and seat cushions. Additional strap members extend transversely from opposite corners of the seat cover and include at least one deformable pad affixed to the end of the strap member for insertion of the end of the strap member between the seat and the car body.

U.S. Pat. No. 4,669,779 discloses a one-piece seat cover for an automotive passenger seat. An additional panel extends from the inside seam which joins the back and seat portions of the cover. Resilient hold-down straps on the seat cover portion are coupled to the panel under the base of the seat by tensioning means. The seat cover cushion is maintained secure and in independent of the position of the seat cushion or its supporting springs.

Also, U.S. Pat. No. 5,129,695, issued to Norman, teaches a flexible bump protector panel attachable to the outer surface of an automobile door to prevent its being dented or nicked by the doors of nearby vehicles. A flexible flap extends from the lower edge of the panel for disposition about the door lower edge. One or more flexible straps are attached to the flap and to the panel upper edge for extension over the door upper edge. The straps can be tensioned prior to door closure for clamping engagement with the door.

SUMMARY OF THE PRESENT INVENTION

The present invention discloses a convertible and drapable fabric article for use in a vehicle and in particular for preventing damage to the vehicle caused by a canine being transported therein. The article exhibits such as a canvas material and includes a first fabric half and a second fabric half, these separated by an intermediate section exhibiting a plurality of parallel spaced and crosswise extending fold lines.

The intermediate section supports the fabric article upon a ledge associated with a door window opening of the vehicle, in a first configuration, and such that the first half drapes over an exterior of the vehicle adjacent the window opening. At least one element is associated with a selected one of the first and second fabric halves, for releasably securing the article to the vehicle, and in order to support the paws of a canine perched upon the door window opening and extending across an open window.

In the first configuration, the releasably securing elements include a plurality of magnets associated with the first fabric half and which secure against a metallic outer surface associated with the vehicle exterior. The fabric article is capable of being reconfigured in a second configuration such that the first fabric half is secured to a seat back associated with a vehicle seat interior, the second fabric half being supported upon a seat bottom.

It is further envisioned that the plurality of magnets are embedded in axially spaced location within at least one of the straps in interengaging fashion in the initial draping configuration and such that the backside of the first fabric half is held in magnetically supported fashion against the exterior of the vehicle door.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
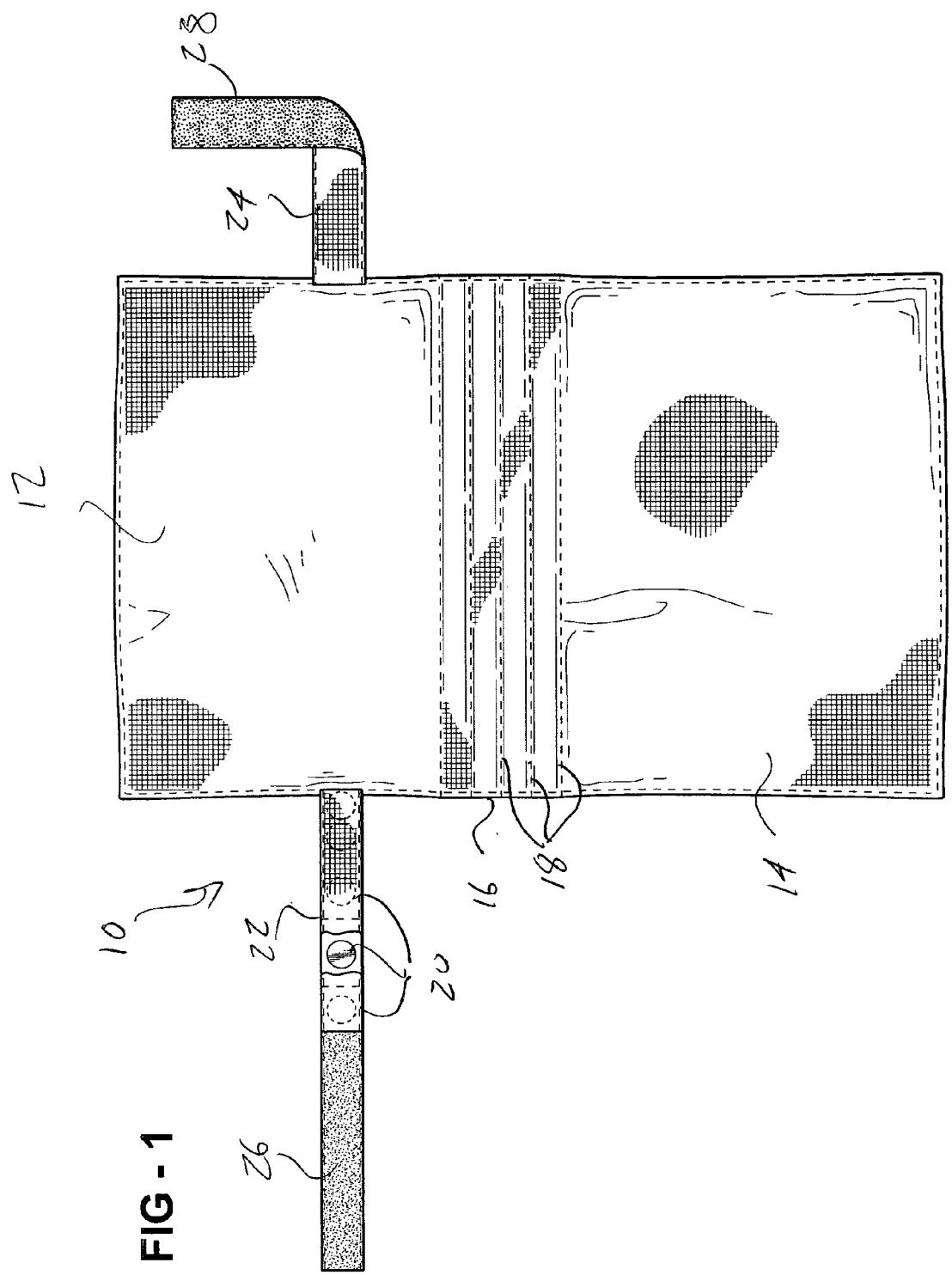
FIG. 1 is a plan view of the combination draping canine fabric article and seat cover according to the present invention.
Figure 2:
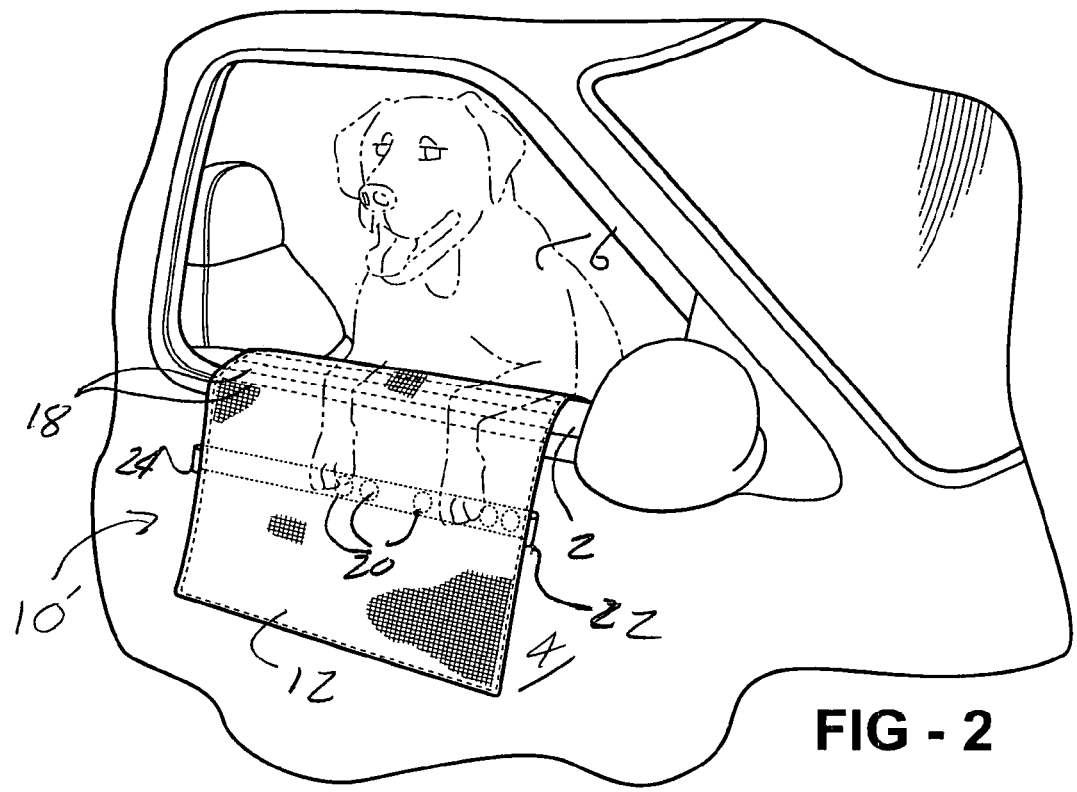
FIG. 2 is a first perspective illustrating the article in a first door panel draping configuration and in order to support the paws of a canine perched upon the door panel and extending across an open window.
Figure 3:
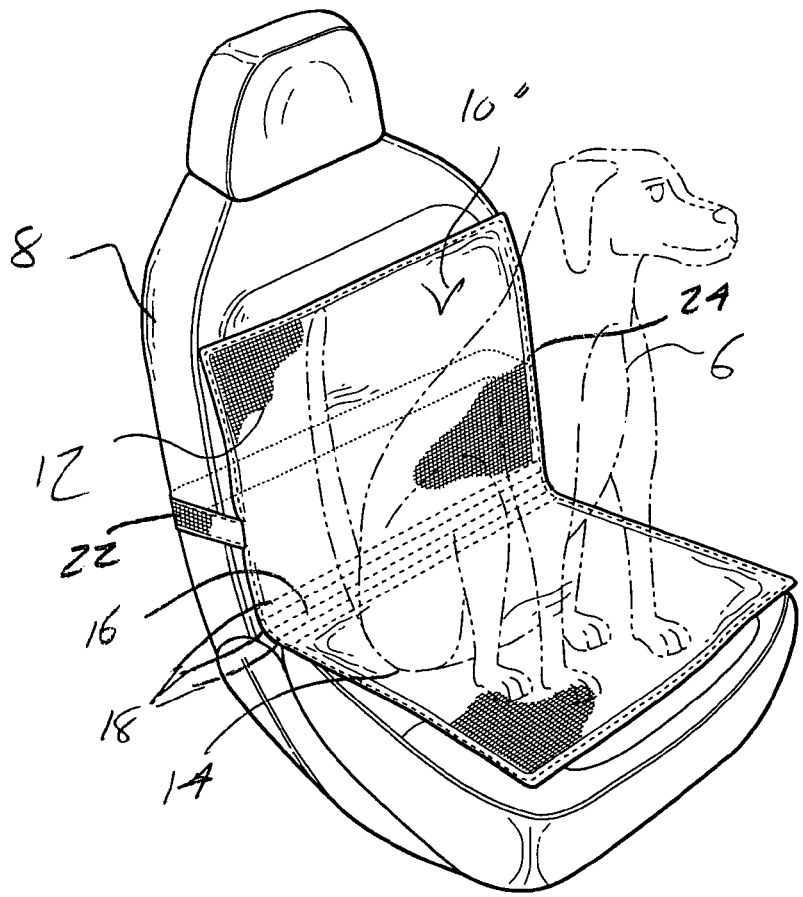
FIG. 3 is a second perspective illustrating the invention in a second seat supported configuration for use with a canine.

Referring now to FIGS. 1-3, the present invention discloses a convertible and drapable fabric article 10 for use in a vehicle and in particular for preventing damage to the vehicle caused by a canine being transported therein. As described herein, the article of the present invention provides a convenient article for protecting both the interior and exterior of a vehicle from damage done by a canine, typically its paws, when arrayed in associated first and second configurations.

The article exhibits such as a canvas material and includes a first fabric half 12 and a second fabric half 14, separated by an intermediate section 16 exhibiting a plurality of parallel spaced and crosswise extending fold lines 18. As further referenced in FIG. 2, the intermediate section 16 supports the fabric article upon a ledge, see at 2, associated with a door window opening of a conventional vehicle, in a first configuration and such that the first half 12 drapes over an exterior surface 4 of the vehicle adjacent the window opening.

At least one element is associated with a selected one of the first and second fabric halves 12 and 14, and in order to releasably secure the article to the vehicle, such as in configuration 10' illustrated in FIG. 2. This is further such that the front paws of a canine 6, whose legs are perched upon the door window opening and such that they extend across the open window ledge 2, are supported upon the first fabric half 12 and are prevented from scratching or otherwise damaging the exterior surface 4 of the vehicle.

In the first configuration, the releasably securing elements include a plurality of magnets 20 associated with the first fabric half 12 and which secure against a metallic outer surface associated with the vehicle exterior (see again FIG. 2). It is further envisioned that the plurality of magnets 20 are embedded in axially spaced location within at least one of first and second straps 22 and 24 arranged in interengaging fashion in the initial draping configuration (see again as in phantom in FIG. 2) and such that the backside of the first fabric half 12 is held in magnetically supported fashion against the exterior of the vehicle door.

As illustrated in FIG. 1, the straps 22 and 24 may extend from respective opposite edge locations of the first fabric half 12. It is also envisioned that the strap ends 22 and 24 may be provided by a single strap sewn into the lining of the first half 12 or, further, that the magnets 20 may be individually secured in some other fashion such as directly within an interior lining of the fabric half 12.

Referring now to FIG. 3, the fabric article is capable of being reconfigured in a second configuration, see at 10", such that the first fabric half 12 is secured to a back portion of an interior vehicle seat 8, the second fabric half 14 being supported upon a seat bottom. In this variant, extending ends of the straps 22 and 24 (or ends of a single continuous strap) are provided with hook-and-loop fasteners, see at 26 and 28 respectively as best shown in FIG. 1, in order to interengage to adapt to the configuration of FIG. 3, whereby the seat 8 is protected from the canine 6 supported thereupon. As is commercially known in the art, the hook-and-loop fasteners may be provided by releasably interengageable VELCRO® portions among other types of engagement fasteners, couplings, and the like.

Having described my invention, other and additional preferred embodiments will become apparent to those skilled in the art to which it pertains, and without deviating from the scope of the appended claims.

I claim:

1. A convertible and drapable fabric article for use in a vehicle, comprising:

a first fabric half and a second fabric half separated by an intermediate section exhibiting at least one fold line;

said intermediate section supporting said fabric article upon a ledge associated with a door window opening of the vehicle in a first configuration, such that said first half drapes over an exterior of the vehicle adjacent the window opening;

at least one element associated with at least one of said first and second fabric halves for releasably securing said article to the vehicle and in order to support the paws of a canine perched upon the door window opening and extending across an open window, said releasably securing elements further comprising a plurality of magnets associated with said first fabric half and for securing against a metallic surface associated with the vehicle exterior in said first configuration; and said fabric article being reconfigured in a second configuration, such that said first fabric half is secured to a seat back associated with a vehicle seat interior, said second fabric half being supported upon a seat bottom, said releasably securing element further comprising first and second straps exhibiting hook-and-loop fasteners, said straps interengaging across a reverse face of the seat back.

2. The article as described in claim 1, further comprising said plurality of magnets being embedded in axially spaced location within at least one of said straps in interengaging fashion.

3. The article as described in claim 1, said fabric article exhibiting a specified shape and size and including a plurality of fold lines associated with said intermediate section.

4. The article as described in claim 1, said fabric article exhibiting a specified shape and size and comprising a canvas material.

5. A convertible and drapable fabric article for use in a vehicle, comprising:

a first fabric half and a second fabric half separated by an intermediate section exhibiting at least one fold line;

said intermediate section supporting said fabric article upon a ledge associated with a door window opening of the vehicle in a first configuration, such that said first half drapes over an exterior of the vehicle adjacent the window opening;

at least one element associated with at least one of said first and second fabric halves for releasably securing said article to the vehicle and in order to support the paws of a canine perched upon the door window opening and extending across an open window, said releasably securing elements further comprising a plurality of magnets associated with said first fabric half and for securing against a metallic surface associated with the vehicle exterior; and said fabric article being reconfigured in a second configuration such that said first fabric half is secured to a seat back associated with a vehicle seat interior, said second fabric half being supported upon a seat bottom, additional releasably securing elements further comprising first and second straps exhibiting hook-and-loop fasteners and interengaging across a reverse face of the seat back to retain said article in said second configuration.

6. The article as described in claim 5, further comprising said plurality of magnets being embedded in axially spaced location within at least one of first and second straps extending across a reverse face of the seat back in interengaging fashion.

7. The article as described in claim 5, said fabric article exhibiting a specified shape and size and including a plurality of fold lines associated with said intermediate section.

8. The article as described in claim 5, said fabric article exhibiting a specified shape and size and comprising a canvas material.

* * * * *